United States Patent Office 3,343,571
Patented Sept. 26, 1967

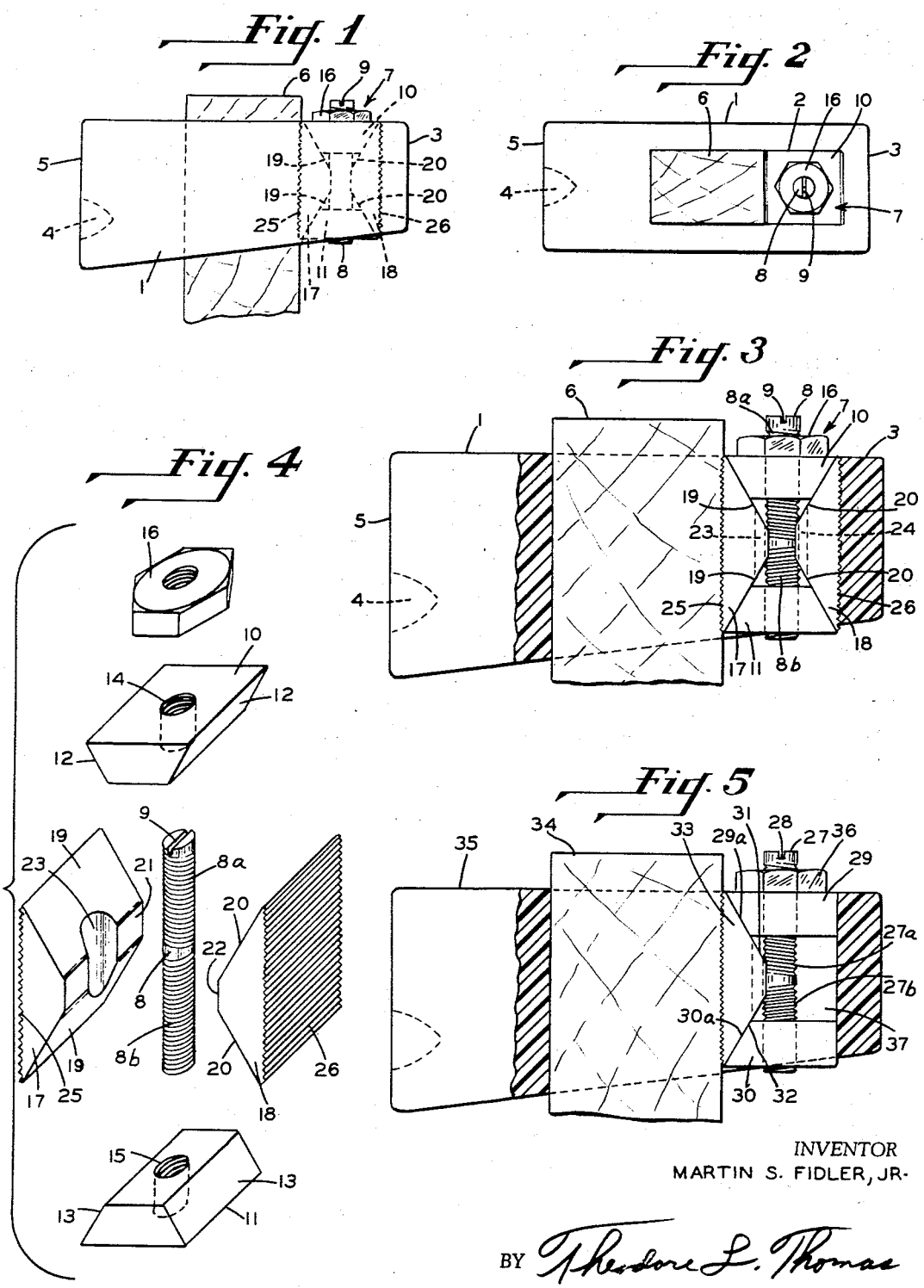

3,343,571
LOOM PICKER RETENTION MEANS
Martin S. Fidler, Jr., Columbia, Pa., assignor to Armstrong Cork Company, Lancaster, Pa., a corporation of Pennsylvania
Filed Mar. 29, 1966, Ser. No. 538,396
5 Claims. (Cl. 139—159)

ABSTRACT OF THE DISCLOSURE

Adjustable loom picker head retention means adapted to be positioned in a vertical opening in a picker head between the picker stick and the rear surface of the opening. The device consists of an actuator rod having oppositely threaded portions thereon, internally threaded wedge elements mounted on opposite ends of the actuator rod and clamping means having oblique surfaces positioned in contact with the oblique surfaces of the wedge elements. Rotation of the actuator rod results in longitudinal movement of the wedge elements and horizontal movement of the clamping means to vary the tension between the picker head and the picker stick.

This invention relates to loom pickers and in particular to an improved means for adjustably mounting and securing the picker head on the picker stick.

In the past, the most popular method of maintaining a picker head on the upper end of a picker stick was to form a hole through the back or side of the loop portion of the picker head, pass a wood screw therethrough and imbed it in the stick. Picker heads so mounted tended to loosen and become excessively worn or damaged due to the numerous and powerful shuttle impacts. This made it necessary to realign the picker head by adjusting it vertically on the stick or, if worn too much, to replace it. The adjustments of the picker head normally required were so minute that they could not be made using the original screw hole in the loop portion of the picker head, since this would require moving of the head a distance sufficient to enable a new screw hole to be made in the picker stick. Such minute adjustments were usually made by removing the screw and after making the necessary adjustment to the picker head the screw was put through the loop section of the head and into the stick at a new location. This added another hole to the stick and weakened the picker head as well. Ordinarily, however, a picker stick still has a much longer life expectancy than a picker head and there are several times during the life of a picker stick when replacement of the picker head is required. After several replacements, the screw hole in the picker stick may be so reamed out that the screw will no longer hold, or the stick will have a number of holes in a small area from readjusting the head which would tend to weaken the stick at a point where its maximum strength should be maintained. This requires replacement of the stick more often than would otherwise be necessary. In addition, the entry hole in the side or back of the usual screw held picker head tends to weaken the loop section thereof.

Attempts have been made in the past to solve the above problems. For example, U.S. Patent 2,754,851 discloses a picker having a vertical opening for the reception of a picker stick and a screw actuated wedge element which cooperates with a fixed element extending across the opening to effect clamping pressure to hold the picker on the picker stick. The disclosures of U.S. Patents 1,517,768; 2,569,994, and 2,740,431 are further examples of attempts to, in addition to eliminating the aforementioned damage to pickers and picker sticks, find a way to provide a means for accomplishing this which would allow the picker head to be easily adjustable vertically in minute amounts and which would hold the head firmly on the stick and yet allow the tension between the picker and the stick to be easily adjusted and evenly distributed over a large area of the stick and the picker head.

It is an object of this invention to provide means for mounting a picker on a picker stick which requires no penetration into the stick and no hole through the loop portion of the picker head. An additional object of this invention is to provide a device for mounting picker heads on picker sticks which may be adjusted vertically in minute amounts without damage to the picker head or the picker stick. It is a further object of this invention to provide a means for mounting a picker head on a stick whereby the tension between the picker and the stick may be increased or decreased conveniently to any desired degree. It is still a further object to provide an adjustable mounting means for picker heads which provides a more evenly distributed clamping force over a larger area of the stick and the picker head. It is a further object of this invention to provide a mounting means for picker heads which may be adjusted to create the desired tension between the picker head and the stick and be locked, after the picker has been precisely adjusted with respect to the impact point of the shuttle, to create an evenly distributed clamping force without causing any vertical movement of the clamping device.

Briefly stated, the invention relates to a picker having a vertically disposed opening in the rear portion thereof in which is accommodated a picker stick and an adjustable device for retaining the picker on the stick. The device comprises two wedge members mounted on oppositely threaded portions of a common actuator rod and two separate movable gripping elements having inclined surfaces positioned in contact with the inclined surfaces on the wedge members. The gripping elements are adapted to be moved outwardly by the wedge members upon rotation of the actuator rod to securely clamp the picker to the stick.

The invention will be more fully understood by reading the following detailed description in connection with the accompanying drawings.

FIG. 1 is a side elevational view of the top portion of a picker stick showing a picker secured thereon by the improved mounting device of my invention;

FIG. 2 is a plan view of the upper end of the picker stick with the attached picker as shown in FIG. 1;

FIG. 3 is an enlarged, partially broken away, side elevational view of the top portion of the picker stick with the picker secured thereon by the improved mounting device of my invention;

FIG. 4 is an enlarged exploded perspective view of the picker retention means of my invention showing the parts before they are assembled; and FIG. 5 is an enlarged partially broken away side elevational view of an assembled picker stick and picker head wherein a modified form of the picker retention means of my invention is shown.

Referring to the drawings in greater detail and especially FIGS. 1, 2 and 3, the numeral 1 indicates a picker which is preferably made of polyethylene but which may be made of any of the conventional materials normally used for this purpose such as other synthetic resins, leather, laminated layers of cloth impregnated with rubber and vulcanized together, etc. The picker has a vertically disposed opening 2, which is rectangular in horizontal section, in the rear portion 3 and a conical, shuttle receiving recess 4 in the front face 5 thereof. Positioned in the opening 2 of the picker 1 is the top portion 6 of a conventional picker stick. In the opening 2 between the picker stick 6 and the rear surface of the opening 2 there is positioned the improved mounting and tensioning device of my invention indicated generally by the numeral 7. The device 7 comprises a rod or shaft 8 having oppositely threaded top and bottom portions 8a and 8b and a slot 9 in the top portion thereof. Positioned on the oppositely threaded portions 8a and 8b of the shaft 8 are wedge members 10 and 11 which have oblique surfaces 12 and 13 and centrally located openings 14 and 15 therein. The openings 14 and 15 in wedge members 10 and 11 have internal threads complemental in pitch to the threads on each respective end of the shaft 8. A lock nut 16 is provided to prevent loosening of the device after proper application. Adapted to be mounted between the wedge members 10 and 11 adjacent either side of shaft 8 are gripping members 17 and 18 having oblique surfaces 19 and 20, flattened portions 21 and 22, and vertical grooves 23 and 24. The clamping faces of gripping members 17 and 18 are transversely serrated providing teeth 25 on member 17 which bite into the adjacent side of the picker stick 6 and teeth 26 on member 18 which bite into the picker 1 at the rear surface of the opening 2 during clamping. The disassembled parts of the picker retention device of my invention are more clearly shown in FIG. 4.

FIG. 5 shows a modified form of the mounting device of my invention wherein there is provided a rod or shaft 27 having oppositely threaded top and bottom portions 27a and 27b and a slot 28 in the top portion thereof. Internally threaded wedge elements 29 and 30 are mounted on oppositely threaded portions 27a and 27b of shaft 27. Inclined face portions 29a and 30a on the elements 29 and 30 are adapted to cooperate with similarly inclined faces 31 and 32 on gripping element 33. When the rod 27 is rotated, elements 29 and 30 will be moved toward or away from each other along the shaft and cause gripping element 33 to move toward or away from the picker stick 34. Obviously, when gripping element 33 is moved toward picker stick 34 by members 29 and 30, the members 29 and 30 together with the shaft 27 and associated lock nut 36 will be moved in the opposite direction causing the rear surfaces of members 29 and 30 to press against the rear surface of opening 37 in the picker 35 and thereby hold the picker 35 firmly on picker stick 34.

With the exception of the screw 8 and the lock nut 16, the device is preferably made of one or made of the high strength plastics such as polycarbonates, polyacetals, chlorinated polyethers, etc. This is desirable in order to keep the combined weight of the picker and retention means close to that of the conventional picker in order not to upset the momentum factors in the loom.

Prior to installation of the mounting device 7, the gripping members 17 and 18 and wedge members 10 and 11 may be held in assembled relationship by, for example, a rupturable adhesive applied at the edge portions of the contact areas of oblique surfaces 12, 13, 19 and 20.

With the picker 1 positioned on the upper end of the picker stick 6, the mounting device 7 is then placed in the opening 2. The rod or shaft 8 is then rotated in a clockwise direction to cause wedge elements 10 and 11 to be drawn toward each other by means of the oppositely threaded portions 8a and 8b on shaft 8. The sliding action of their oblique surfaces against the oblique surfaces of the gripping elements 17 and 18 causes the gripping elements to move sidewise, thus forcing the toothed clamping surface 25 on gripping member 17 into contact with the picker stick 6, and simultaneously forces the toothed clamping surface 26 on gripping member 18 into contact with the rear surface of the opening 2 in the picker 1. The picker 1 is then adjusted vertically on the picker stick 6 to the desired position and the shaft 8 is further rotated to force the teeth or serration 25 on gripping member 17 into picker stick 6 and the teeth 26 on gripping element 18 into the rear surface of the hole 2 in the picker 1 and the lock nut 16 is tightened. If readjustment should be required, it is merely necessary to loosen the lock nut 16 and rotate shaft 8 in a counterclockwise direction to release the tension on the device sufficiently to enable it to be moved. After adjustment, the procedure previously stated is followed to re-establish the holding pressure of the device on the picker 1 and the picker stick 6 and to assure maintenance of the established pressure.

From the foregoing, it can be seen that this invention provides a mounting device for holding picker heads on picker sticks wherein:

(1) A simple picker head and stick may be used with no alterations thereof required.

(2) Neither the picker head or stick is damaged by the mounting means.

(3) Pressure is applied evenly to the clamping members at two separate points resulting in easier and better adjustment of the tension which in turn results in increased stability and less tendency for the head to loosen, move out of alignment and be damaged.

(4) Tightening of the holding device after alignment of the picker head with the impact point of the shuttle causes no vertical movement of the picker head.

(5) Due to the design and operation of the component parts of the device, the picker head and all the parts of the mounting device except the threaded rod and the lock nut may be made of plastic, which affords a saving in weight and expense.

I claim:

1. In combination, a loom picker comprising a picker head having a vertical opening in the rear portion thereof adapted to receive the upper end of a picker stick, adjustable picker head mounting means positioned in said vertical opening in said picker head between said picker stick and the rear surface of said opening, said mounting means comprising an actuator rod having oppositely disposed threaded portions thereon, two internally threaded wedge elements each having at least one oblique surface thereon and mounted one on each of said oppositely disposed threaded portions of said actuator rod for longitudinal movement therealong upon rotation of said rod, clamping means having oblique surfaces thereon positioned in contact with said oblique surfaces on said wedge elements mounted on said actuator rod, said clamping means adapted to be forced outwardly by said wedge members as they move toward each other along said actuator rod when said rod is rotated.

2. A loom picker according to claim 1 wherein each of the wedge elements mounted on the actuator rod are in the shape of a truncated wedge and having a rectangular base portion and two oblique edge portions extending along the length of each element.

3. A loom picker according to claim 2 wherein the clamping means is a pair of clamping members, each clamping member having two oblique edge surfaces across the widths thereof, each of said oblique surfaces being positioned in contact with one of the oblique edge portions of said wedge elements mounted on said actuator rod.

4. A loom picker according to claim 3 wherein each clamping member is provided with a lengthwise centrally located slot on the inner surface thereof and a grip facilitating configuration on the back surface thereof.

5. A loom picker according to claim 4 wherein the picker head is made of polyethylene.

References Cited
UNITED STATES PATENTS

| | | | |
|---|---|---|---|
| 1,517,768 | 12/1924 | Towers | 139—159 |
| 2,104,832 | 1/1938 | Doden Hoff | 139—159 |
| 2,389,157 | 11/1945 | Kottemann | 139—159 |
| 2,569,994 | 10/1951 | Huffman | 139—159 |
| 2,754,851 | 7/1956 | Lundgren | 139—159 |
| 3,116,763 | 1/1964 | Nill | 139—159 |

MERVIN STEIN, *Primary Examiner.*

J. KEE CHI, *Assistant Examiner.*